(12) United States Patent
Chew

(10) Patent No.: US 9,355,048 B2
(45) Date of Patent: May 31, 2016

(54) METHOD FOR IMPLEMENTING SECURE DATA CHANNEL BETWEEN PROCESSOR AND DEVICES

(75) Inventor: Yen Hsiang Chew, Penang (MY)

(73) Assignee: INTEL CORPORATION, Santa Clara, CA (US)

( * ) Notice: Subject to any disclaimer, the term of this patent is extended or adjusted under 35 U.S.C. 154(b) by 392 days.

(21) Appl. No.: 13/997,956

(22) PCT Filed: Mar. 28, 2012

(86) PCT No.: PCT/US2012/030933
§ 371 (c)(1),
(2), (4) Date: Jun. 25, 2013

(87) PCT Pub. No.: WO2013/147766
PCT Pub. Date: Oct. 3, 2013

(65) Prior Publication Data
US 2014/0068129 A1    Mar. 6, 2014

(51) Int. Cl.
*G06F 13/24* (2006.01)
*H04L 29/06* (2006.01)

(52) U.S. Cl.
CPC ............. *G06F 13/24* (2013.01); *H04L 63/12* (2013.01); *H04L 63/14* (2013.01)

(58) Field of Classification Search
CPC ........ H04L 63/12; H04L 63/123; H04L 63/14
USPC .......................................... 713/153; 710/269
See application file for complete search history.

(56) References Cited

U.S. PATENT DOCUMENTS

| 6,625,679 | B1 | 9/2003 | Morrison et al. | |
|---|---|---|---|---|
| 6,721,813 | B2 | 4/2004 | Owen et al. | |
| 7,398,343 | B1* | 7/2008 | Marmash | G06F 13/24 710/240 |
| 8,069,291 | B2 | 11/2011 | Krig | |
| 2002/0073262 | A1 | 6/2002 | Godfrey | |
| 2010/0185876 | A1* | 7/2010 | Kim | G06F 3/023 713/190 |
| 2013/0275639 | A1* | 10/2013 | Chew | G06F 13/24 710/269 |
| 2014/0237144 | A1* | 8/2014 | Chew | G06F 13/24 710/50 |

OTHER PUBLICATIONS

International Search Report, PCA/ISA/210, Oct. 29, 2012, total of 3 sheets.

* cited by examiner

*Primary Examiner* — Glenn A Auve
(74) *Attorney, Agent, or Firm* — Pillsbury Winthrop Shaw Pittman LLP

(57) ABSTRACT

Apparatuses, systems, and methods are directed to securely store, transfer, and/or process data especially sensitive data sent from input devices to processors. In one embodiment, sensitive data may be packaged with at least one interrupt vector to provide a single posted write transaction initiated by an input device. The single posted write transaction may then be directly sent to a predetermined memory block allocated from a processor. In response to the single posted write transaction, a memory decoder associated with the processor may generate an emulated message signaled interrupt (MSI) signal to invoke an interrupt handler or an interrupt service routine (ISR) to service the emulated MSI using interrupt data, including the sensitive data, retrieved from the predetermined memory block. Once the sensitive data are processed by the processor, they may be removed from the processor before the processor exits the interrupt handler.

27 Claims, 3 Drawing Sheets

METHOD FOR IMPLEMENTING SECURE DATA CHANNEL BETWEEN PROCESSOR AND DEVICES

CROSS REFERENCE TO RELATED APPLICATIONS

This application is the U.S. National Stage of PCT/US2012/030933, filed Mar. 28, 2012, the contents of which are hereby incorporated by reference herein in its entirety.

TECHNICAL FIELD

This disclosure relates generally to the field of data processing, and in particular, to secure data processing between processor and devices.

BACKGROUND ART

Electronic input devices, such as keyboards, touchpads, and network input devices, often send data to a processor for further processing. The data sent for processing may be sensitive data that need to be protected, which are often encrypted and stored inside system memory. Processors typically need to retrieve a decryption key that is associated with the stored encrypted data before it may proceed to decrypt and process the encrypted data. Conventional processes of retrieving a decryption key either require that the processors query the input device via one or more input/output (I/O) transactions or that the processors obtain the key using additional secure system protocols. Problems arise, however, because cryptographic keys stored inside system memory are susceptible to snooping by malware processes or hackers employing cold boot attacks.

It is, therefore, desirable to provide methods, apparatus, and systems for implementing secure data processing between electronic input devices and processors.

DETAILED DESCRIPTION

Figure 1:
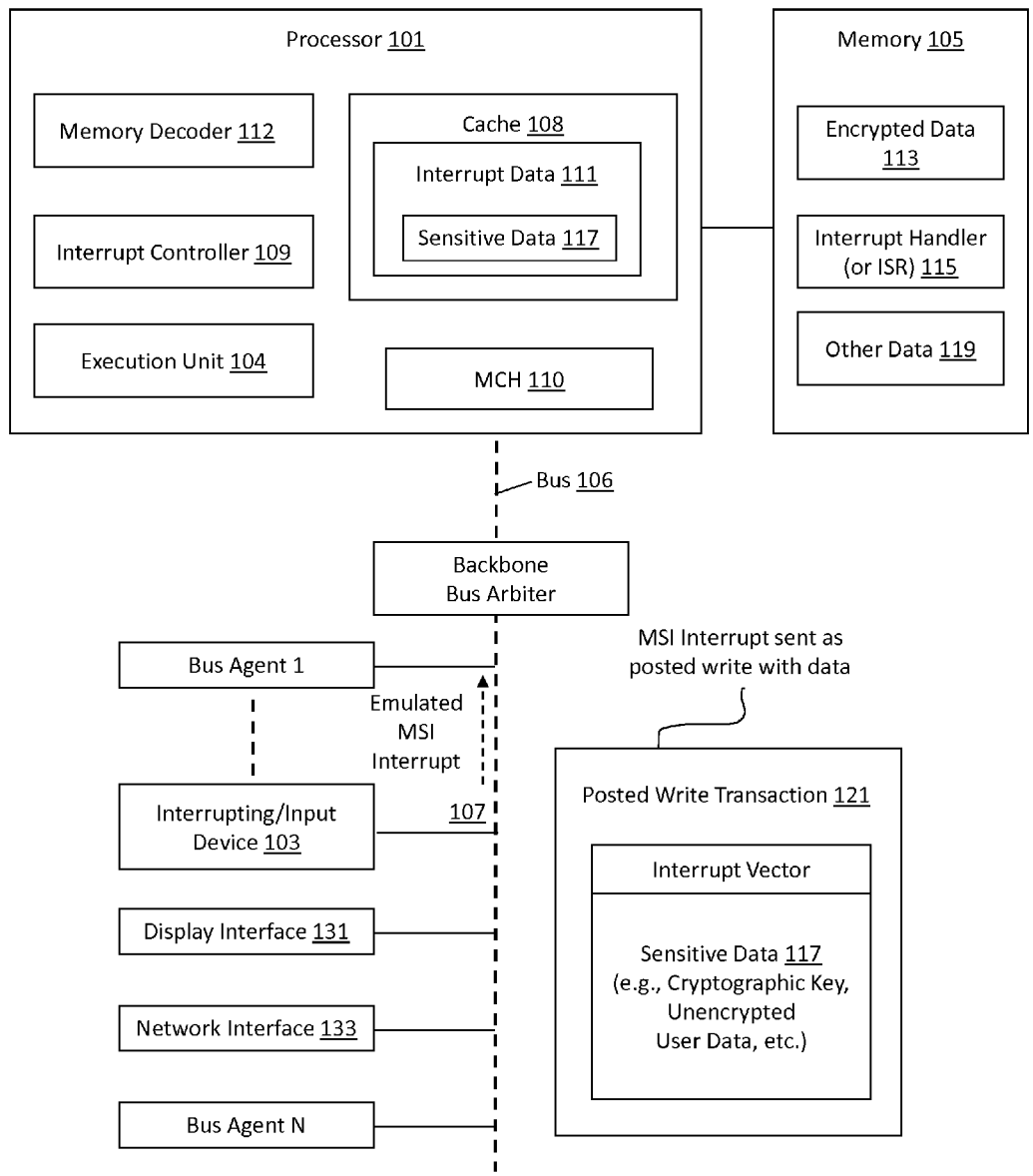
FIG. 1 depicts an exemplary high-level functional block diagram for implementing secure data channel between input devices and processors, in accordance with various aspects of the present disclosure.

In the description that follows, like components have been given the same reference numerals, regardless of whether they are shown in different embodiments. To illustrate embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various embodiments of this disclosure, what is proposed is a method, apparatus, and system to securely store, transfer, and/or process any data especially sensitive data sent from electronic input devices (or input devices) to processors. In one embodiment, exemplary sensitive data is to be packaged with an interrupt vector to provide a single posted write transaction initiated by an input device. The single posted write transaction may then be sent to a predetermined memory block allocated from a processor cache. In response to the single posted write transaction, a memory decoder associated with the processor may generate an emulated message signaled interrupt (MSI) signal for interrupt controller to invoke an interrupt handler or an interrupt service routine (ISR) to service the emulated MSI using interrupt data including the sensitive data retrieved from the predetermined memory block. Once the sensitive data are processed by the processor, they may be removed from the processor cache before the processor exits the interrupt handler.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

In the disclosed embodiments, a mechanism is provided to enable an input device to request an emulated MSI interrupt by sending interrupt data directly to the processor to emulate an MSI interrupt, without having to send an actual MSI interrupt request to a system defined address for conventional MSI that is non-emulated.

As used herein, the term "interrupt data" may include, without limitation, an interrupt vector and/or data as desired such as sensitive data that need to be stored, transferred, and/or processed. In some embodiments, the interrupt data may further include, for example, an address of a filled data buffer or other data associated with the emulated MSI interrupt. In other embodiments, the emulated MSI interrupt using interrupt data, including at least an interrupt vector and/or data as desired, may be referred to herein as "MSI-with-data," while the interrupt data may be referred to herein as "MSI interrupt data". As disclosed herein, the interrupt data is not limited to the format or size required by a conventional MSI request. As a result, an input device may send to the processor more data in a variety of formats than a regular or conventional MSI request may allow.

As used herein, the term "sensitive data" refers to any data that need to be protected when stored, transferred, and/or processed. The sensitive data may be user sensitive data or proprietary data. The sensitive data may include, without limitation, unencrypted user data such as a user's password or keystrokes to a processor to initiate a user login process or a secure transaction, a cryptographic control/key associated with encrypted data, and/or any data including user input data, user account data, user personal data, password data, keystroke data, text data, voice data, video data, image data, configuration data, system management data, network data, bit stream data, firmware, machine code, software, and/or data received from a second computing device. Input devices may include, but are not limited to, a user input device (e.g. a keyboard, a keypad, a touchpad, a mouse, etc.) a network device, a wireless communication device, a graphics device, a video-encode/video-decode device, an audio device and/or other devices that are associated with a processor and intend to securely send data to the processor for further processing.

In the disclosed embodiments, sensitive data, that are conventionally stored inside a system memory (as opposed to processors) and retrieved by querying the input device or using a secure system protocol, are now: packaged with interrupt vector(s) into a single posted write transaction; directly sent to processor cache via an emulated MSI interrupt for further processing by the processor; and/or removed from the processor after being processed and before exiting interrupt handler.

In this manner, a secure data channel between a processor and associated devices may be formed to improve system robustness against malicious attacks. For example, emulated MSI interrupts with interrupt data, i.e., MSI-with-data, may significantly reduce interrupt processing time for processors, especially for the cases where sensitive data do not need to be encrypted and then decrypted. The principles, as disclosed herein, may also prevent malicious codes from snooping user sensitive or proprietary data sent to a processor from an input device. Accordingly, systems designed thereof are more robust and secure. Moreover, the disclosed principles may prevent hackers from obtaining user sensitive or proprietary data sent to a processor from an input device using a cold boot attack. Further, the disclosed principles may enhance data protection between input devices and a processor and reduce the likelihood of identity theft in user sensitive applications. Even further, the disclosed principles may be extended to enhance TXT (trusted execution) technology and the disclosed security feature may be used as a customer security requirement for enabling future applications that require tighter protection for sensitive data.

Turning attention to the figures, FIG. 1 is a functional block diagram illustrating an example of system 100 having emulated MSI interrupt handling in accordance with an embodiment of the present disclosure. System 100 may represent any of a number of electronic and/or computing devices used to securely store, transfer, and/or process data sent from input devices for processing. Such electronic and/or computing devices may include servers, desktops, laptops, mobile devices, smartphones, gaming devices, tablet computers, networking devices, etc.

Referring to FIG. 1, system 100 includes, but is not limited to, processor 101 coupled to a bus infrastructure such as a processor bus 106 (also referred to as a front side bus or FSB), where the bus is coupled to one or more input devices such as device 103 via an I/O bus or interconnect 107. It will be appreciated that in some implementations, system 100 may include more or less components. Moreover, although some components may be shown as being separate, such components may equally be integrated on one platform.

In accordance with an embodiment, when an electronic input device, such as the device 103, is about to assert an emulated MSI, instead of sending a regular MSI request message to a system defined address for MSI, the device 103 is configured to send and store interrupt data 111 to be utilized during the interrupt service to an associated memory block (e.g., cache line) of processor cache 108 (e.g., processor level-2 (L2) or level-3 (L3) cache) via a posted write transaction 121. Interrupt data 111 may further include an interrupt vector representing an entry point of an interrupt service routine (ISR) or an interrupt handler 115 associated with the device. For each electronic input device that is capable of handling the emulated MSI interrupts, a predetermined memory block is allocated for the device. Each electronic input device is able to directly access its associated memory block via a posted write transaction 121, e.g., using direct cache access (DCA) techniques. The size of a memory block associated with the electronic input device may vary depending upon specific configuration or needs, which may be configurable during the initialization process of the electronic input device.

Processor 101 may represent a single or multiple processors with single or multiple processor cores. Processor 101 may further include memory controller hub (MCH) 110 to enable processor 101 or other devices, such as device 103 to access system memory 105 over a memory bus or interconnect. In one embodiment, processor 101 includes processor cache 108 having predetermined memory blocks (or predefined cache lines) allocated to input device 103 to store interrupt data 111. In this manner, when interrupt controller 109, such as advanced programmable interrupt controller (APIC), invokes an execution unit 104 of processor 101 to handle an interrupt, such an emulated MSI interrupt requested from the input device 103, execution unit 104 may directly access the corresponding memory block of the processor cache 108 associated with the device 103 to retrieve interrupt data 111 of the device for the purpose of servicing the emulated MSI interrupt.

Memory decoder 112 (or decoder logic, e.g., a processor cache-line-write decode logic) associated with processor 101 or a bus is configured to monitor and detect any posted write transaction 121 to the allocated process cache 108 for the purpose of detecting emulated MSI interrupts (as opposed to an MSI or a conventional MSI) initiated from input device 103 and to invoke the interrupt controller 109 to issue an MSI interrupt based on the interrupt data. In some embodiments, the memory decoder 112 may also reside outside processor 101 and coupled to MCH 110. In response to detection of a posted write transaction 121, memory decoder 112 retrieves or causes interrupt controller 109 to retrieve the interrupt vector from the allocated memory block (or the processor cache line). When processor 101 invokes ISR or interrupt handler 115 associated with the device based on the interrupt vector, processor 101 may access the memory block specifically allocated to the device to retrieve the interrupt data 111, including exemplary sensitive data 117, and service the interrupt using the interrupt data without obtaining the same interrupt data from the device via I/O transactions or from the system memory, which may take a relatively long period of time or may be unsecure. In one example, an emulated MSI interrupt is directly sent to the processor and the interrupt vector of the MSI is intercepted by processor APIC. The memory decoder logic may assert a signal (e.g. toggling an internal data signaling line) to processor APIC to inform processor APIC of a pending emulated MSI interrupt. In some embodiments, the memory decoder 112 is configured to: (1) obtain the interrupt vector from memory block and send the interrupt vector to processor APIC, and/or (2) pass the memory block address to processor APIC and processor APIC then fetches the interrupt vector from the memory block based on the received memory block address. Specific processor cache and/or memory blocks (cache lines) may be allocated in order to prevent interrupt data written to these allocated cache lines from being automatically replaced by the processor cache line replacement algorithm (e.g. least recently used (LRU) cache line replacement policy).

In some embodiments, the interrupt data to be stored in the memory block may include multiple interrupt vectors, each being associated with an ISR or an entry point of an ISR. In response to detection of a posted write transaction 121 to the memory block, memory decoder 112 may be configured to retrieve the interrupt vectors from the memory block. For each of the interrupt vectors, the memory decoder 112 is configured to invoke the interrupt controller to access the interrupt vector from the memory block and invoke the processor or the processor core to execute an ISR associated with the interrupt vector. Such interrupt vectors may be associated with ISR routines that service multiple functions of the input device or multiple devices. As a result, a single posted write transaction 121 may request multiple MSI interrupts, including all the necessary interrupt data to be utilized during the associated interrupt services, without having to individually requesting multiple MSI interrupts to the system defined address for MSI.

In certain embodiments, an input device that wants to assert an MSI interrupt to processor 101 may selectively pre-send device specific information, including sensitive data 117, to processor using direct cache access (DCA) mechanism. Processor 101 pre-allocates and locks down a processor cache line entry for each device associated with the system. Pre-allocated cache line addresses may be written to each device's direct cache access register, so that whenever a device wants to assert an MSI interrupt to processor, it performs a posted write transaction 121 to processor's cache (e.g. a L3 shared cache) using the processor cache line address in its direct cache access register. Data written to the processor cache line may contain one or more interrupt vectors and other interrupt data including, for example filled DMA buffer addresses, devices specific messages or tags, etc. to assist processor in servicing the interrupt without having to poll device registers using multiple I/O transactions. The memory decoder 112, e.g., a user configurable cache-line-write decode logic, may be coupled to processor's cache. When configurable cache-line-write decode logic detects a direct cache access write operation to a user configured pre-allocated cache line address in processor cache, it will assert an MSI emulated interrupt signal to processor APIC and send the processor cache line address to processor APIC. Processor APIC receives the MSI emulated interrupt signal and obtains all interrupt vectors and other interrupt data from the processor cache line entry pointed to by the processor cache line address. Processor APIC may assign the processing of each interrupt vector to different processor cores to be processed in parallel. Each processing core may also utilize interrupt data pushed into processor cache to assist in servicing interrupts based on its assigned interrupt vector.

It will be appreciated that the configuration as shown in FIG. 1 is described for the purpose of illustration only. In certain embodiments, other memory blocks may be allocated from, for example, system memory 105 and accessible by processor 101 via MCH 110 in order to store data for devices such as the device 103. In various embodiments, system 100 may further include a display interface 131, a network interface 133, and other possible components, which, for example, are integrated into one single platform such as a system on a chip (SOC). The display interface 131 may communicate with a display including, for example, standalone monitor screens, integrated display screens, touch screens, etc. The network interface 133 may communicate with a wireline network, such as, for example, twisted pair, coaxial, fiber optic cable, etc. Alternatively, the network interface 133 may communicate with a wireless network, such as, for example, LTE, WiFi, BlueTooth, WiMax, etc.

Figure 2:
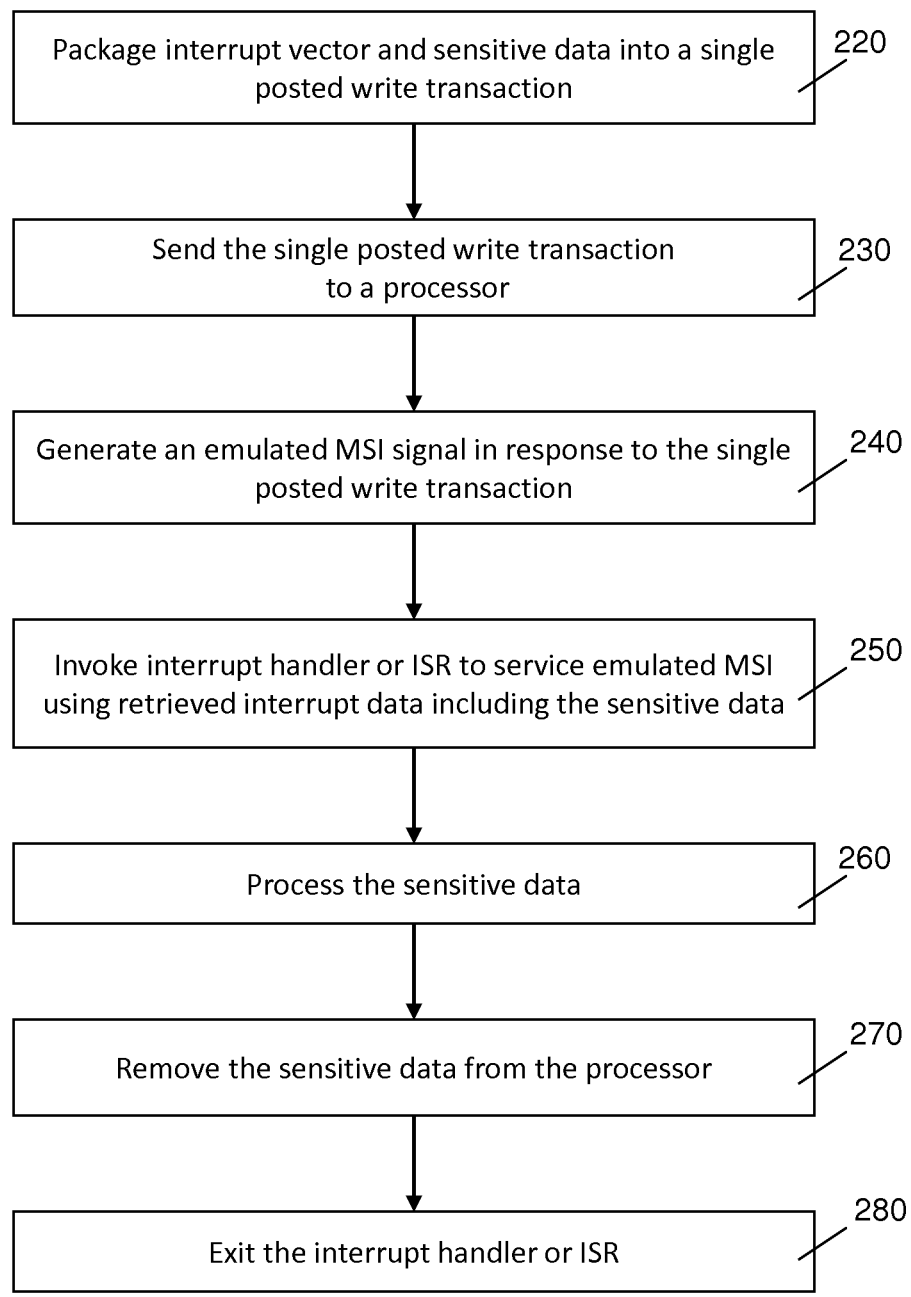
FIG. 2 depicts a flow diagram of an exemplary process for implementing secure data channel, in accordance with various aspects of the present disclosure.

FIG. 2 depicts a functional flow diagram of process 200 for secure data processing, in accordance with various aspects of the present disclosure. For illustration purpose, aspects of FIG. 2 are described herein relative to the features depicted by FIG. 1.

At block 220 of process 200, an input device 103 may be initiated to package an interrupt vector with sensitive data 117 into a single posted write transaction 121. At block 230 of process 200, the single posted write transaction 121 initiated from the device may be directly sent to a predetermined memory block allocated from a processor cache 108 of a processor 101. At block 240 of process 200, an emulated message signaled interrupt (MSI) signal may be generated by a memory decoder 112 in response to the single posted write transaction 121 to the predetermined memory block initiated from the device 103. At block 250 of process 200, an interrupt service routine (ISR) or an interrupt handler 115 associated with the device 103 may be invoked by an interrupt controller 109 to service the emulated MSI using interrupt data 111 including sensitive data retrieved from the predetermined memory block allocated from the processor cache 108. In embodiments, the interrupt handler 115 runs at a high priority level and is non-preempt-able. The interrupt handler 115 may be invoked immediately upon detection of, for example, the DCA write. At block 260 of process 200, the interrupt data 111 including sensitive data may be processed by the processor 101 and then removed or wiped clean from the predetermined memory block allocated from the processor cache 108 by the processor 101 (see, e.g., block 270 of FIG. 2) prior to exiting the ISR by the interrupt controller 109 of the processor 101 (see, e.g., block 280 of FIG. 2).

In embodiments, one or more steps of process 200 depicted in FIG. 2 may be atomically performed so as not to be pre-empted by any software such as malware, in the cases for example, when directly sending the single posted write transaction 121 to the predetermined memory block allocated from the processor cache at block 230; when invoking the ISR by the interrupt controller via DCA and/or processing sensitive data through the interrupt handler at block 250; when processing exemplary sensitive data at block 260, and/or when removing the sensitive data from the processor cache at block 270.

In some embodiments, the sensitive data may be data having relatively smaller sizes that are suitable for the memory block allocated from the processor cache 108. Data having suitable sizes for memory blocks may include, for example, unencrypted user data or user proprietary data such as keystrokes from a keyboard or input from a touch screen device. Such data may be atomically sent to a processor 101. In one embodiment, the unencrypted user data may be localized inside the processor cache 108 and not able to be obtained from a system memory using a cold boot attack. In one example, unencrypted user data may be directly send to a predefined processor L3 cache line using DCA. Cache-line-write decode logic may then detect the DCA write to the predefined processor L3 cache line and assert an emulated MSI signal to processor APIC. Processor APIC may then immediately invoke a processor interrupt handler to process the unencrypted data and discard the data (invalidate the processor cache line or wipes the user data) after user data has been processed before exiting the interrupt handler. That is, the device sends unencrypted user sensitive data to processor and request for atomic processing of the unencrypted user data by sending the data as a posted write transaction 121 to a predefined cache line, which immediately triggers an interrupt handler for processing the data. The unencrypted data is wiped clean before interrupt handler exists. This ensures that the unencrypted user data cannot be effectively snooped by another thread or malware. Even during a cold boot attack, user data in processor L3 cache will be lost and hence protected from being obtained by a hacker. As disclosed, sending relatively small user data directly to cache line using the disclosed system and methods for secure channel is fast and effective and consumes minimal CPU cycles and virtually no I/O cycles for processor to poll device registers.

Figure 3:
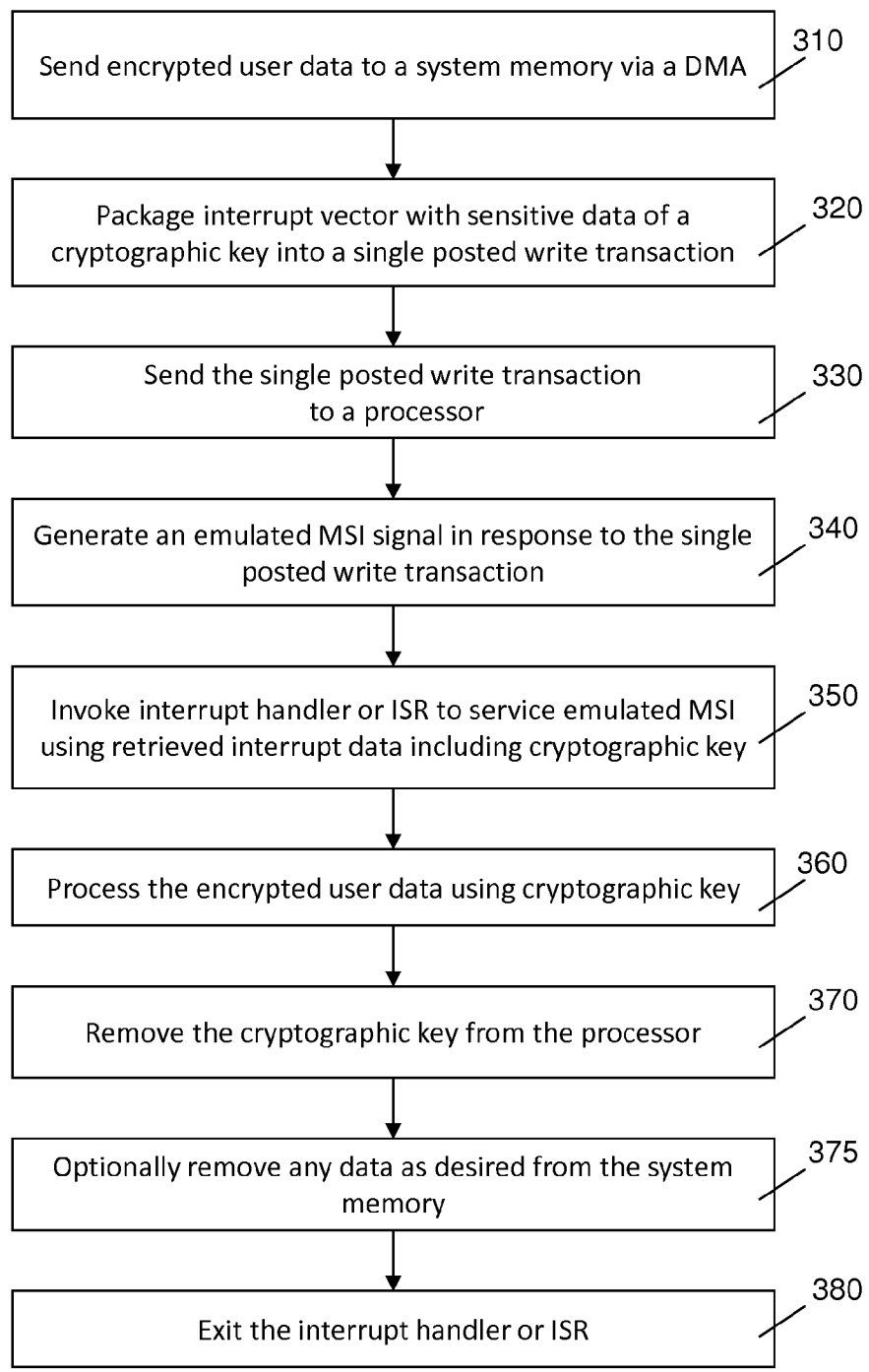
FIG. 3 depicts a flow diagram of an exemplary process for implementing secure data channel, in accordance with various aspects of the present disclosure.

FIG. 3 depicts a functional flow diagram of process 300 for secure data processing, in accordance with various aspects of the present disclosure. For example, the sensitive data may be a cryptographic key and one or more of the blocks of process 300 depicted in FIG. 3 may be atomically performed.

At block 310 of process 300, encrypted user data 113 (see FIG. 1) may be sent via direct memory access (DMA) techniques to a specific memory region of a system memory 105 coupled to a processor 101 from an exemplary device 103. At block 320 of process 300, an interrupt vector may be packaged with sensitive data, including a cryptographic key associated with the encrypted user data 113, into a single posted write transaction 121. At block 330 of process 300, the single posted write transaction 121 initiated from the device 103 may be directly sent to a predetermined memory block allocated from a processor cache 108 of a processor 101. At block 340 of process 300, an emulated message signaled interrupt (MSI) signal may be generated by a memory decoder 112 in response to the single posted write transaction 121 to the predetermined memory block initiated from the device 103. At block 350 of process 300, an ISR or an interrupt handler 115 associated with the device 103 may be invoked by an interrupt controller 109 to service the emulated MSI using interrupt data 111 including sensitive data retrieved from the predetermined memory block allocated from the processor cache 108. In embodiments, the interrupt handler 115 runs at a high priority level and is non-preempt-able. The interrupt handler 115 may be invoked immediately upon detection of the DCA write.

At block 360 of process 300, encrypted data 113 may be decrypted using cryptographic key of interrupt data 111. The decrypted data may then be processed by the processor 101. After processing, interrupt data 111 including cryptographic key (see 117) may be removed or wiped clean from predetermined memory block allocated from the processor cache 108 by the processor 101 (see, e.g., block 370 of FIG. 3) prior to exiting the ISR 115 by the interrupt controller 109 of the processor 101 (see, e.g., block 380 of FIG. 3). Optionally, at block 375 of process 300, any data as desired that are stored in the system memory including, for example, the encrypted data 113 and any other data 119 (which may be generated as a result of processing the encrypted data 113 including "intermediate" decrypted sensitive data and any other sensitive data), may be removed or wiped clean from the system memory 105 prior to exiting the ISR 115 by the interrupt controller 109 of the processor 101 (see, e.g., block 380 of FIG. 3). In other words, any data may be optionally wiped clean as desired from system memory and/or processor cache, depending on where they are stored, prior to exiting the interrupt handler. For example, depending on requirement level for security of these data, selective sections of memory 105 containing encrypted data 113 and other data 119 (e.g., the "intermediate" decrypted sensitive data) may or may not be removed by the interrupt handler prior to exiting the ISR.

In certain examples of process 300, device encrypts user data and sends the encrypted data to processor using direct memory access (DMA) and stores the encrypted data inside system memory. When DMA operation is performed, device will send filled DMA buffer address and the cryptographic key for decrypting the encrypted data as a posted write transaction 121 to a predefined processor L3 cache line using direct cache access (DCA). The memory decoder 112 detects the DCA write to the predefined processor L3 cache line and asserts an MSI emulated interrupt signal to processor APIC. Processor APIC immediately invokes a processor interrupt handler to process the DMA operation. Interrupt handler obtains the decryption key from cache line, performs the decryption process, and discards the key without having to store it in system memory. Interrupt handler may also remove or wipe clean any intermediate data generated as a result of processing the encrypted data from system memory or processor cache to prevent the intermediate data from being obtained by malware. Interrupt handler may be configure to be non preempt-able during the decryption process to ensure that no other processes or malware is able to interrupt the process and snoop cache to obtain the decryption key or any intermediate data generated when interrupt handler is processing the encrypted data. That is, decryption key for an encrypted user data is directly sent from a device to a predefined cache line to atomically invoke an interrupt handler after a DMA operation is complete without the need for processor to obtain the decryption key using additional secure system protocol or I/O transactions. In embodiments, the device coupled to the processor via a processor bus or system bus may be enabled to encrypt its user data using any dynamically or randomly generated cryptographic keys and send the decryption key associated with the encrypted data to the processor using the disclosed system and methods of secure channel between a device and a processor. The encryption/decryption processing is typically performed by a cryptographic engine that provides encryption and decryption services to the associated data.

Referring back to FIG. 1, various embodiments also include a method performed by a processor or a device. For such a method, a memory address may be retrieved from a predetermined register of a device such as the device 103, the memory address representing a predetermined memory block specifically allocated from a processor cache 108 associated with a processor 101 and allocated to the device 103. A posted write transaction 121 may then be issued over a bus 106 to the predetermined memory block based on the memory address to store interrupt data 111 at the predetermined memory block. The interrupt data 111 may include sensitive data packaged with an interrupt vector to trigger an emulated message signaled interrupt (MSI). An interrupt service routine (ISR) 115 may be invoked based on the interrupt vector retrieved from the predetermined memory block to service the emulated MSI using the interrupt data 111 retrieved from the predetermined memory block. The interrupt data 111 including the sensitive data may be processed and removed from the processor cache 108 prior to exiting the ISR 115 to provide a secure channel of the sensitive data between the processor and the device. In embodiments, a machine-readable storage medium which causes the processor or device to perform the above method may also be provided as disclosed herein.

Having thus described the novel concepts and principles of securely processing data, it will be apparent to those skilled in the art after reading this detailed disclosure that the foregoing detailed disclosure is intended to be presented by way of example only and is not limiting. Various alterations, improvements, and modifications will occur and are intended to those skilled in the art, though not expressly stated herein. The alterations, improvements, and modifications are intended to be suggested by this disclosure, and are within the spirit and scope of the exemplary aspects of this disclosure. Additionally, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful aspects of the disclosure, it is to be understood that such detail is solely for that purpose, and that the appended claims are not limited to the disclosed aspects, but, on the contrary, are intended to cover modifications and equivalent arrangements that are within the spirit and scope of the disclosed aspects.

What is claimed is:

1. A method comprising:
packaging an interrupt vector with sensitive data to provide a single posted write transaction initiated from an input device;
sending the single posted write transaction initiated from the input device to a predetermined memory block allocated from a processor;
generating an emulated message signaled interrupt (MSI) signal, by a memory decoder, in response to the single posted write transaction initiated from the input device and sent to the predetermined memory block; and
invoking, by an interrupt controller, an interrupt service routine (ISR) associated with the input device to service the emulated MSI using interrupt data retrieved from the predetermined memory block allocated from the processor, wherein the interrupt data includes the sensitive data.

2. The method of claim 1, further comprising:
processing the sensitive data by the processor;
removing the sensitive data from the predetermined memory block from the processor; and
exiting the ISR by the processor.

3. The method of claim 2, wherein one or more steps thereof are atomically performed so as not to be preempted by software.

4. The method of claim 1, wherein the sensitive data comprises a cryptographic key, unencrypted user data, user input data, user account data, user personal data, password data, keystroke data, text data, voice data, video data, image data, configuration data, system management data, network data, bit stream data, firmware, machine code, software, data received from a second computing device, and combinations thereof.

5. The method of claim 1, wherein the ISR is atomically invoked based on the interrupt vector retrieved from the predetermined memory block rather than via an MSI request message, wherein the ISR is scheduled as non-preempt-able.

6. The method of claim 1, wherein the emulated MSI signal is generated based on the single posted write transaction from the predetermined memory block other than a system defined address for an MSI that is non-emulated.

7. The method of claim 1, wherein the interrupt data is stored in the predetermined memory block by the input device via a direct cache access (DCA) transaction over a bus coupling the input device to the processor.

8. The method of claim 1, wherein the sensitive data are unencrypted user data, wherein the unencrypted user data are localized inside the processor and not able to be obtained from a system memory using a cold boot attack.

9. The method of claim 1, wherein, when directly sending the sensitive data as the single posted write transaction, the input device requests for an atomic processing of the sensitive data comprising unencrypted user data.

10. A method comprising:
sending encrypted user data to a system memory initiated from an input device via a direct memory access (DMA);
packaging an interrupt vector with sensitive data to provide a single posted write transaction initiated from the input device, the sensitive data comprising a cryptographic key associated with the encrypted user data;
sending the single posted write transaction initiated from the input device to a predetermined memory block allocated from a processor;
generating an emulated message signaled interrupt (MSI) signal, by a memory decoder, in response to the single posted write transaction initiated from the input device and sent to the predetermined memory block; and
invoking, by an interrupt controller, an interrupt service routine (ISR) associated with the input device to service the emulated MSI using interrupt data comprising the sensitive data and retrieved from the predetermined memory block allocated from the processor.

11. The method of claim 10, further comprising:
processing the encrypted user data by the processor using the sensitive data comprising the cryptographic key; and
removing the sensitive data from the predetermined memory block after processing and prior to exiting the ISR.

12. The method of claim 11, wherein one or more steps thereof are atomically performed so as not to be preempted by any software comprising malware, the one or more steps comprising
directly sending the single posted write transaction to the predetermined memory block allocated from the processor;
invoking the ISR by the interrupt controller; and
removing the sensitive data from the processor.

13. The method of claim 10, further comprising removing data from the system memory and processor, the data comprising decrypted data and intermediate data generated as a result of processing the encrypted data sent from the input device.

14. The method of claim 10, further comprising removing the encrypted user data from the system memory after processing the encrypted user data and prior to exiting the ISR.

15. The method of claim 10, wherein, without a need for the processor to obtain the sensitive data comprising the decryption key using an additional secure system protocol or an additional input/output (I/O) transaction, the sensitive data is directly sent from the input device to the processor to atomically invoke the ISR after the DMA operation.

16. The method of claim 10, wherein an encryption key associated with the encrypted user data is not stored in the system memory.

17. The method of claim 10, further comprising encrypting user data initiated from the input device using the cryptographic key that is dynamically or randomly generated, to form the encrypted user data.

18. The method of claim 10, wherein the interrupt data further comprises an address of a filled data buffer.

19. A system comprising:
an input device, the input device being configured to package an interrupt vector with sensitive data into a posted write transaction;
a processor, the processor comprising:
a memory decoder to monitor a predetermined memory block allocated from the processor and allocated to the input device;
an interrupt controller to receive an emulated message signaled interrupt (MSI) signal from the memory decoder in response to the posted write transaction; and
an execution unit to execute an interrupt service routine (ISR) associated with the input device to service the emulated MSI using interrupt data comprising the sensitive data retrieved from the predetermined memory block allocated from the processor; and a bus, the bus coupling the input device to the processor such that the input device is configured to directly send the posted write transaction to the predetermined memory block allocated from the processor over the bus.

20. The system of claim 19, wherein the ISR is invoked based on the interrupt vector retrieved from the predetermined memory block rather than via an MSI request message.

21. The system of claim 19, wherein the emulated MSI signal is generated based on the posted write transaction from the predetermined memory block other than a system defined address for an MSI that is non-emulated.

22. The system of claim 19, wherein the interrupt data is stored in the predetermined memory block allocated from the processor by the input device via a direct cache access (DCA) transaction over a bus coupling the input device to the processor.

23. The system of claim 19, wherein the sensitive data comprises a cryptographic key, unencrypted user data, user input data, user account data, user personal data, password data, keystroke data, text data, voice data, video data, image data, configuration data, system management data, network data, bit stream data, firmware, machine code, software, data received from a second computing device, and combinations thereof.

24. A method comprising:
retrieving a memory address from a predetermined register of an input device, the memory address representing a predetermined memory block specifically allocated from a processor and allocated to the input device; and
issuing a posted write transaction over a bus to the predetermined memory block based on the memory address to store interrupt data at the predetermined memory block, wherein the interrupt data comprises sensitive data packaged with an interrupt vector to trigger an emulated message signaled interrupt (MSI),
wherein an interrupt service routine (ISR) is invoked based on the interrupt vector to service the emulated MSI using the interrupt data stored at the predetermined memory block, and wherein the interrupt data comprising the sensitive data are processed and removed from the processor prior to exiting the ISR.

25. The method of claim 24, wherein the interrupt data comprising the sensitive data is stored in the memory block, allocated from the processor, by the input device via a direct cache access (DCA) transaction over the bus.

26. A non-transitory machine-readable storage medium comprising instructions, which, when executed by a processor or an input device, causes the processor or the input device to perform a method, the method comprising:
retrieving a memory address from a predetermined register of the input device, the memory address representing a predetermined memory block specifically allocated from a processor and allocated to the input device; and
issuing a posted write transaction over a bus to the predetermined memory block based on the memory address to store interrupt data at the predetermined memory block, wherein the interrupt data comprises sensitive data packaged with an interrupt vector to trigger an emulated message signaled interrupt (MSI)),
wherein an interrupt service routine (ISR) is invoked based on the interrupt vector to service the emulated MSI using the interrupt data stored at the predetermined memory block, and wherein the interrupt data comprising the sensitive data are processed and removed from the processor prior to exiting the ISR.

27. The non-transitory machine-readable storage medium of claim 26, wherein the interrupt data comprising the sensitive data is stored in the memory block, allocated from the processor, by the input device via a direct cache access (DCA) transaction over the bus.

* * * * *